(12) United States Patent
Lincoln et al.

(10) Patent No.: US 11,754,533 B2
(45) Date of Patent: Sep. 12, 2023

(54) PHOTOACOUSTIC DETECTION SYSTEM WITH CLOCKED TUNING FORK POSITIONS

(71) Applicant: CARRIER CORPORATION, Palm Beach Gardens, FL (US)

(72) Inventors: David L. Lincoln, Cromwell, CT (US); Michael J. Birnkrant, Wethersfield, CT (US); Peter R. Harris, West Hartford, CT (US); Marcin Piech, East Hampton, CT (US); Arthur Blanc, Providence, RI (US); Jose-Rodrigo Castillo-Garza, East Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 299 days.

(21) Appl. No.: 17/053,864

(22) PCT Filed: May 8, 2019

(86) PCT No.: PCT/US2019/031241
§ 371 (c)(1),
(2) Date: Nov. 9, 2020

(87) PCT Pub. No.: WO2019/217507
PCT Pub. Date: Nov. 14, 2019

(65) Prior Publication Data
US 2021/0231619 A1 Jul. 29, 2021

Related U.S. Application Data

(60) Provisional application No. 62/670,188, filed on May 11, 2018.

(51) Int. Cl.
*G01N 29/24* (2006.01)
*G01N 29/02* (2006.01)
(Continued)

(52) U.S. Cl.
CPC ..... *G01N 29/2425* (2013.01); *G01N 21/1702* (2013.01); *G01N 29/022* (2013.01);
(Continued)

(58) Field of Classification Search
CPC ... G01N 2021/1704; G01N 2021/1708; G01N 21/1702; G01N 21/3504;
(Continued)

(56) References Cited

U.S. PATENT DOCUMENTS 4,897,541 A 1/1990 Phillips
6,870,626 B2 3/2005 Autrey et al.
(Continued)

FOREIGN PATENT DOCUMENTS

CN 103175791 A * 6/2013
CN 107271368 10/2017
(Continued)

OTHER PUBLICATIONS

Patimisco et al, Quartz-Enhanced Photoacoustic Spectroscopy: a Review, Sensors 2014, 14, 6165-6206; doi:10.3390/s140406165 (Year: 2014).*

(Continued)

*Primary Examiner* — David L Singer
(74) *Attorney, Agent, or Firm* — Carlson, Gaskey & Olds, P.C.

(57) ABSTRACT

A photoacoustic detection system (20) includes a detector (22) that has a chamber (24), a pulsed light source (26), piezoelectric tuning forks (28), and a photosensor (30). The chamber has an inlet and an outlet for flow of an analyte. The pulsed light source is adjacent the chamber and is operable to emit a light beam along a path through the chamber. The tuning forks are arranged along the path, and each of the tuning forks is operable to emit first sensor signals. The photosensor is arranged along the path and is operable to (Continued)

emit second sensor signals. A controller (38) is connected to receive the first and second sensor signals. The controller is configured to determine whether a target species is present in the analyte based on the first sensor signals and determine whether the target species is present in the analyte based on the second sensor signals.

7 Claims, 4 Drawing Sheets

(51) Int. Cl.
  *G01N 21/17* (2006.01)
  *G01N 29/036* (2006.01)
  *G02B 5/00* (2006.01)

(52) U.S. Cl.
  CPC ....... *G01N 29/036* (2013.01); *G01N 29/2443* (2013.01); *G02B 5/008* (2013.01); *G01N 2021/1704* (2013.01); *G01N 2021/1708* (2013.01); *G01N 2291/0217* (2013.01); *G01N 2291/02809* (2013.01); *G01N 2291/106* (2013.01)

(58) Field of Classification Search
  CPC . G01N 2291/0217; G01N 2291/02809; G01N 2291/101; G01N 2291/106; G01N 29/022; G01N 29/036; G01N 29/2418; G01N 29/2425; G01N 29/2437; G01N 29/2443; G02B 5/008
  See application file for complete search history.

(56) References Cited

U.S. PATENT DOCUMENTS

| | | | |
|---|---|---|---|
| 8,848,191 B2 | 9/2014 | Lust | |
| 9,651,476 B2 | 5/2017 | Speck et al. | |
| 2005/0117155 A1* | 6/2005 | Kosterev | G01N 29/2425 356/432 |
| 2005/0262944 A1* | 12/2005 | Bennett | G01N 29/4427 73/592 |
| 2006/0198760 A1 | 9/2006 | Potyrailo | |
| 2006/0266108 A1 | 11/2006 | DiFoggio | |
| 2006/0266109 A1* | 11/2006 | DiFoggio | G01N 29/2425 73/152.16 |
| 2008/0127715 A1* | 6/2008 | Kosterev | G01N 21/1702 73/24.02 |
| 2008/0179998 A1* | 7/2008 | Kawashima | H03H 9/0547 29/25.35 |
| 2009/0027677 A1 | 1/2009 | Willing et al. | |
| 2009/0174884 A1* | 7/2009 | Kosterev | G01N 29/2418 356/432 |
| 2009/0249861 A1* | 10/2009 | Van Dijk | G01N 21/1702 73/24.02 |
| 2009/0288474 A1* | 11/2009 | Kalkman | G01N 29/2425 73/24.02 |
| 2010/0007889 A1 | 1/2010 | Van Kesteren | |
| 2011/0001964 A1 | 1/2011 | Kalkman et al. | |
| 2011/0072886 A1 | 3/2011 | Caneau | |
| 2011/0083509 A1 | 4/2011 | Li et al. | |
| 2011/0088453 A1* | 4/2011 | Nicoletti | G01N 21/1702 73/24.02 |
| 2011/0216311 A1* | 9/2011 | Kachanov | G01N 21/39 356/213 |
| 2011/0290002 A1* | 12/2011 | Heidrich | G01N 29/2418 73/24.02 |
| 2013/0056626 A1 | 3/2013 | Shen et al. | |
| 2013/0229660 A1 | 9/2013 | Goldschmidt et al. | |
| 2016/0169740 A1* | 6/2016 | Jiang | G01J 3/433 356/407 |
| 2017/0038343 A1* | 2/2017 | Kshirsagar | G01N 29/2425 |
| 2017/0292935 A1 | 10/2017 | Ren et al. | |

FOREIGN PATENT DOCUMENTS

| | | | | |
|---|---|---|---|---|
| CN | 108593763 A | * | 9/2018 | .......... G01N 29/022 |
| JP | 2009036578 | | 2/2009 | |

OTHER PUBLICATIONS

Elia et al, Photoacoustic Techniques for Trace Gas Sensing Based on Semiconductor Laser Sources, Sensors 2009, 9, 9616-9628; doi:10.3390/s91209616 (Year: 2009).*
Bruech, Technical Information & Training Document Introduction of Tuning Fork Quartz Crystals, Nakagawa Electronics Limited (Year: 2009).*
International Preliminary Report on Patentability for International Application No. PCT/US2019/031241 dated Nov. 26, 2020.
Szabo, A., Mohacsi, A., Gulyas, G., Bozoki, Z., and Szabo, G. (2013). In situ and wide range quantification of hydrogen sulfide in industrial gases by means of photoacoustic spectroscopy. Measurement of Science and Technology. vol. 24(6).
Helman, M., Moser, H., Dudkowiak, A., Lendl, B. (2017). Off-beam quartz-enhanced photoacoustic spectroscopy-based sensor for hydrogen sulfide trace gas detection using a mode-hop-free external cavity quantum cascade laser. Applied Physics B vol. 123.
Varga, A., Bozoki, Z., Szakall, M., and Szabo, G. (2006). Photoacoustic system for on-line process monitoring of hydrogen sulfide ($H_2S$) concentration in natural gas streams. Applied Physics B. vol. 85(2).
Spagnolo, V., Patimisco, P., Pennetta, R., Sampaolo, A., Scamarcio, G., Vitiello, M.S., and Tittel, F.K. (2015). THz Quartz-enhanced photoacoustic sensor for H2S trace gas detection. Optics Express, vol. 23(6). Mar. 23, 2015.
Siciliani de Cumis, M., Borri, V.S., Patimisco, P., Sampaolo, A., Scamarcio, G., DeNatale, P., Damato, F., and Spagnolo, V. (2014). Widely-tunable mid-infrared fiber-coupled quartz-enhanced photoacoustic sensor for environmental monitoring. Optics Express. vol. 22(23). Nov. 17, 2014.
Lewicki, R., Stefanski, P., Tarka, J., Razeghi, M., Tittel, F.K., Jahjah, M., and Ma, Y. (2013). Chapter 23: Current status of mid-infrared semiconductor-laser-based sensor technologies for trace-gas sensing applications. The Wonder of Nanotechnology: Quantum Optoelectronic Devices and Applications. 2013.
Cao, Y., Jin, W., and Ho, H.L. (2012). Gas detection with evanescent-wave quartz-enhanced photoacoustic spectroscopy. Proceedings of SPIE—The International Society for Opitcal Engineering. Jan. 2012.
Waclawek, J.P., Moser, H., and Lendl, B. (2016). Compact quantum cascade laser based quartz-enhanced photoacoustic spectroscopy sensor system for detection of carbon disulfide. Optics Express, vol. 24(6). Mar. 15, 2016.
International Search Report and Written Opinion for International Application No. PCT/US2019/031241 completed Jul. 19, 2019.

* cited by examiner

PHOTOACOUSTIC DETECTION SYSTEM WITH CLOCKED TUNING FORK POSITIONS

CROSS-REFERENCE TO RELATED APPLICATION

This application claims benefit of U.S. Application No. 62/670,188 filed May 11, 2018.

BACKGROUND

Detection systems can be used to identify smoke or chemicals for early warning of a threat event, for security purposes, or the like. As examples, systems may be designed to identify trace amounts of smoke particles in a building as an early warning of a fire, trace amounts of a target chemical as an early warning of toxicity of an environment, or minute amounts of airborne substances during security screening of humans, luggage, packages, or other objects.

One type of detection system is a photoacoustic detector. Generally speaking, these types of systems rely on interaction between light and a target substance to produce an acoustic response that can be measured and used for detection. A photoacoustic detector may include a chamber, a pulsed light of a pre-selected frequency, and a microphone. Ambient air is circulated through the chamber. The light is pulsed through the chamber and the microphone listens for an acoustic response. The wavelength or spectrum of light coincides with an absorption wavelength of spectrum of the target substance. If the target substance is present in the air, the substance absorbs a portion of the light during light pulses. As the substance absorbs light it heats and causes a local pressure increase in the air. Between pulses the substance cools, thereby producing a local pressure decrease in the air. The alternating pressure increases and decreases manifest as an acoustic signal that can be heard by the microphone and used to identify that the substance is present in the air.

SUMMARY

A photoacoustic detection system according to an example of the present disclosure includes a detector that has a chamber having an inlet and an outlet for flow of an analyte, and a pulsed light source adjacent the chamber. The pulsed light source, when operated, emits a light beam along a path through the chamber. A plurality of piezoelectric tuning forks arranged along the path are operable to emit first sensor signals. A photosensor is arranged along the path and operable to emit second sensor signals. A controller is connected to receive the first and second sensor signals. The controller is configured to (a) determine whether a target species is present in the analyte based on the first sensor signals, and (b) determine whether the target species is present in the analyte based on the second sensor signals.

In a further embodiment of any of the foregoing embodiments, the controller is further configured to identify that a determination that the target species is present in the analyte based on the first sensor signals is a false positive when there is a determination that the target species is not present in the analyte based on the second sensor signals.

In a further embodiment of any of the foregoing embodiments, the controller is configured to trigger a notification in response to the false positive.

A further embodiment of any of the foregoing embodiments includes a beam splitter in the path, the beam splitter operable to divide the light beam into first and second secondary light beams along respective first and second branch paths.

A further embodiment of any of the foregoing embodiments includes a surface plasmon resonance sensor arranged along the first branch path, the surface plasmon resonance sensor operable to emit third sensor signals.

In a further embodiment of any of the foregoing embodiments, the controller is further configured to identify that a determination that the target species is present in the analyte based on the first sensor signals is a false positive when there is a determination that the target species is not present in the analyte based on the third sensor signals.

In a further embodiment of any of the foregoing embodiments, the controller is configured to distinguish a chemical identity of the target species based on a distinct signature across the first, second, and third sensor signals.

In a further embodiment of any of the foregoing embodiments, the controller is configured to trigger a notification in response to the false positive.

In a further embodiment of any of the foregoing embodiments, the plurality of piezoelectric tuning forks includes first and second piezoelectric tuning forks, the first piezoelectric tuning fork arranged on a first side of the path and the second piezoelectric tuning fork arranged on a second, opposite side of the path across from the first piezoelectric tuning fork.

In a further embodiment of any of the foregoing embodiments, the controller includes a differential amplifier connected to receive the first sensor signals of each of the first and second piezoelectric tuning forks. The differential amplifier subtracts the first sensor signals of the second piezoelectric tuning fork from the first sensor signals of the first piezoelectric tuning fork. The first sensor signals of the second piezoelectric tuning fork are out of phase with the first sensor signals of the first piezoelectric tuning fork, to produce differentiated sensor signals.

In a further embodiment of any of the foregoing embodiments, the controller is further configured to determine whether the target species is present in the analyte based on the differentiated sensor signals.

In a further embodiment of any of the foregoing embodiments, the controller is configured to identify that a determination that the target species is present in the analyte based on the first sensor signals is a false positive when there is a determination that the target species is not present in the analyte based on the differentiated sensor signals.

In a further embodiment of any of the foregoing embodiments, the controller is configured to identify whether the plurality of piezoelectric tuning forks are faulty based on the differentiated sensor signals.

A photoacoustic detection system according to an example of the present disclosure includes a detector that ha a pulsed light source operable to emit a light beam along a path, and a plurality of piezoelectric tuning forks arranged side-by-side so as to form a resonance cavity along the path. Each of the piezoelectric tuning forks has a respective unique resonant frequency, and each of the piezoelectric tuning forks are operable to emit sensor signals indicative of a photoacoustic response of an analyte to interaction of the analyte with the light beam. A controller is connected to receive the sensor signals.

In a further embodiment of any of the foregoing embodiments, the path defines a central axis and each of the piezoelectric tuning forks having first and second tines that straddle the central axis.

In a further embodiment of any of the foregoing embodiments, the first and second tines include gold and quartz.

In a further embodiment of any of the foregoing embodiments, each of the piezoelectric tuning forks has an opening defined between tips of the first and second tines, and each opening is oriented at a clocked position about the central axis.

In a further embodiment of any of the foregoing embodiments, the controller is configured to determine whether a target species is present in the analyte based on an intensity of the photoacoustic response.

In a further embodiment of any of the foregoing embodiments, the controller is configured to determine an identity of a target species that is present in the analyte based on a spectrum of the photoacoustic response across the piezoelectric tuning forks.

In a further embodiment of any of the foregoing embodiments, the unique resonant frequencies fall within a range of 4 kHz between a largest one of the unique resonant frequencies frequency and a smallest one of the unique resonant frequencies.

In a further embodiment of any of the foregoing embodiments, the plurality of piezoelectric tuning forks includes first and second piezoelectric tuning forks, and the controller includes a differential amplifier connected to receive the sensor signals of each of the first and second piezoelectric tuning forks. The differential amplifier subtracts the sensor signals of the first piezoelectric tuning fork from the sensor signals of the second piezoelectric tuning fork. The sensor signals of the second piezoelectric tuning fork are out of phase with the sensor signals of the first piezoelectric tuning fork, to produce differentiated sensor signals, and the controller determines whether a target species is present in the analyte based on the differentiated sensor signals.

A photoacoustic detection system according to an example of the present disclosure includes a series of piezoelectric tuning forks arranged side-by-side along an axis. Each of the piezoelectric tuning forks have a unique resonant frequency and each of the piezoelectric tuning forks have first and second tines that straddle the axis so as to form a resonance cavity.

In a further embodiment of any of the foregoing embodiments, the unique resonant frequencies fall within a range of 4 kHz between a largest one of the unique resonant frequencies frequency and a smallest one of the unique resonant frequencies.

In a further embodiment of any of the foregoing embodiments, each of the piezoelectric tuning forks has an opening defined between tips of the first and second tines, and each opening is oriented at a clocked position about the axis.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
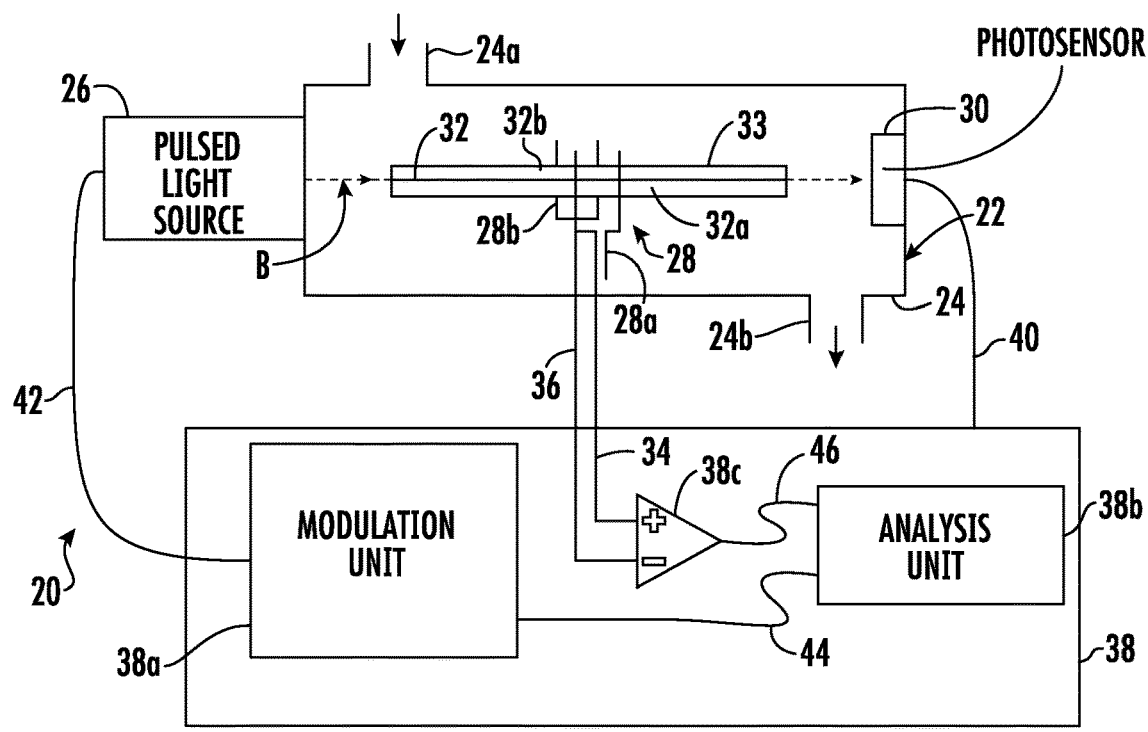
FIG. 1 illustrates an example photoacoustic detection system.

FIG. 1 schematically illustrates an example photoacoustic detection system 20 ("system 20"). As will be appreciated from the examples herein, the system 20 can rapidly perform detection, with enhanced sensitivity and reliability by reducing false positives.

The system 20 includes a detector 22 that is made up of a chamber 24, a pulsed (modulated) light source 26, piezoelectric tuning forks 28, and a photosensor 30. The chamber 24 has an inlet 24a and an outlet 24b for flow of an analyte, such as but not limited to, ambient air. As an example, the system 20 is an aspirating system that utilizes a fluid mover (e.g., a fan, blower, or compressor) to collect and deliver the analyte from a region of interest to the inlet 24a. Optionally, one or more filters may be used upstream of the inlet 24a to remove particulates.

The pulsed light source 26 is adjacent the chamber 24. The light source 26, when operated, emits a light beam B along a path 32 through the chamber 24. Optionally, a resonator tube 33 may be arranged along the path 32, to amplify resonance of the acoustic response later described herein. The light source 26 may be controlled to emit light over a range of discrete wavelengths and/or frequencies. As an example, the light source 26 is a light emitting diode (LED) or laser that can emit a light beam at a wavelength that can be altered in a controlled manner across a range of wavelengths and range of frequencies in a controlled manner. As used herein, "light" may refer to wavelengths in the visible spectrum, as well as near infrared, infrared, and ultraviolet regions. For instance, light source 26 can scan across ranges of wavelengths and/or frequencies. In further examples, the light source 26 can generate broadband light or can generate narrow band light. In another example, the light source emits light in the wavelength range of 1000 nm to 25000 nm. The wavelength range can be adjusted by a filter or a light source can be chosen to generate light with a 10 nm or less spectral width that falls within the wavelength range. The light source can also be controlled to generate multiple discrete wavelengths that are matched to the target species to improve sensitivity and selectivity.

The piezoelectric tuning forks 28 are arranged along the path 32. In this example, there is a first piezoelectric tuning fork 28a and a second piezoelectric tuning fork 28b that have equivalent resonant frequencies. The fabrication materials of the piezoelectric tuning forks 28a, 28b, may be quartz, lead zironate titanate (PZT), Rochelle salt, or other high piezoelectric response electric material. The first tuning fork 28a is arranged on a first side 32a of the path 32, and the second tuning fork 28b is arranged on a second, opposite side of the path 32 across from the first tuning fork 28a.

Figure 2:
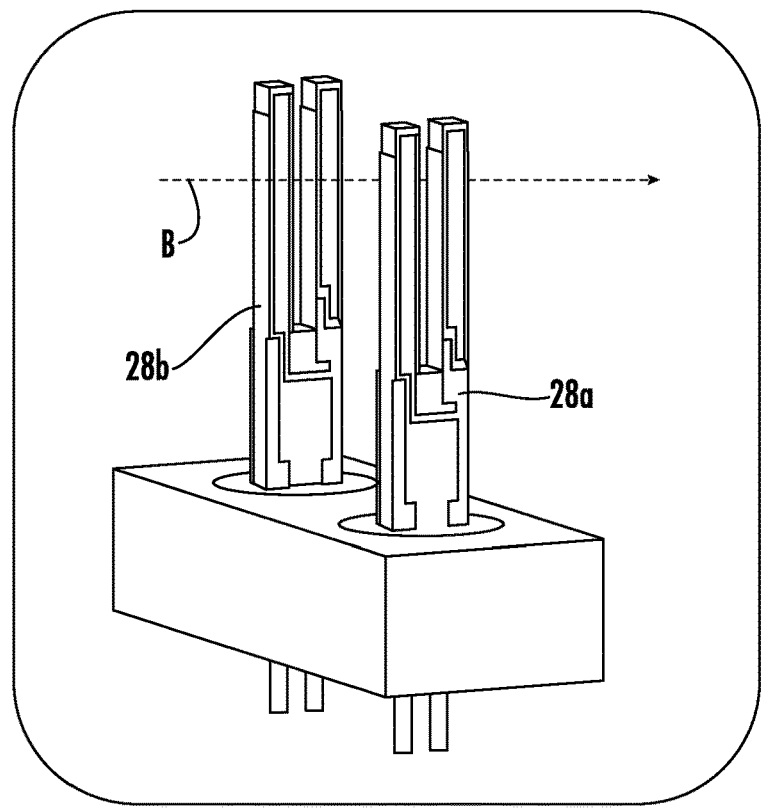
FIG. 2 illustrates an example arrangement of tuning forks in a photoacoustic detection system.

Without the resonator 33, the optimal geometry occurs where the light beam B passes through the legs of the piezoelectric tuning forks 28a, 28b, where the piezoelectric tuning forks 28a, 28b would be located in-line with the light beam B. When using the resonator 33, with two piezoelectric tuning forks 28a, 28b, it is geometrically advantageous to align them just outside of the center of the resonator 33, as shown in the example in FIG. 1. When a resonator is used with one tuning fork, the tuning fork is placed between the resonator halves and the light passes through the legs of the tuning fork. But if two tuning forks are placed between two halves the resonator halves are further apart, which reduces coupling and results in a loss of sensitivity. As shown in FIG. 2, the light beam B passes between the piezoelectric tuning forks 28a, 28b. Alternatively, the piezoelectric tuning forks 28a, 28b could be aligned with the light beam B such that the light beam B passes through both of the piezoelectric tuning forks 28a, 28b, e.g., the beam passes through the forks of each of tuning forks 28a, 28b. It is advantageous to use two piezoelectric tuning forks 28a, 28b (or more) instead of only one in order to enable rejection of ambient vibrations where a differential detection technique can be used. The signals from each piezoelectric tuning forks 28a, 28b may be out of phase from one another, such that when the signals are subtracted, the noise is subtracted, but the photoacoustic signal is not. For example, the signals may be 180 degrees out of phase, in which case the signal would be amplified by 2× in comparison to one tuning fork (and the noise floor would be lowered).

The piezoelectric tuning forks 28a, 28b are communicatively connected at respective connections 34, 36 for communication with a controller 38. It is to be understood that communicative connections or communications herein can refer to optical connections, wire connections, wireless connections, or combinations of connections thereof. The piezoelectric tuning forks 28a, 28b are operable to emit first sensor signals, which are received by the controller 38. The use of piezoelectric tuning forks, versus acoustic transducers such as electret microphones, can advantageously reduce the size of the system 20.

The photosensor 30 is also arranged along the path 32. In this example, the path 32 is linear and the photosensor 30 is thus arranged in a direct line from the light source 26. Alternatively, the path may be non-linear via use of mirrors such that the photosensor 30 would be arranged in an indirect line from the light source 26. The photosensor 30 may be a solid state sensor, such as but not limited to, photodiodes, bipolar phototransistors, photosensitive field-effect transistors, and the like. The photosensor 30 is communicatively connected at 40 with the controller 38 and is operable to emit second sensor signals to the controller 38.

The controller 38 may include hardware (e.g., one or more microprocessors and memory), software, or both, that are configured (e.g., programmed) to carry out the functionalities described herein. In this example, the controller 38 is configured to (a) determine whether a target species is present in the analyte based on the first sensor signals and (b) identify a false positive in determination (a) by independently determining whether the target species is present in the analyte based on the second sensor signals (i.e. a redundancy). These two determinations may be referred to herein as, respectively, a presence determination and a false positive determination.

The controller 38 is configured to make a presence determination using the first sensor signals from the piezoelectric tuning forks 28 by the photoacoustic response of the target species. For example, the controller 38 includes a light source modulation unit 38a that is communicatively connected at 42 to the light source 26. Through the modulation unit 38a the controller 38 can control operation of the light source 26 and thus the characteristics of the light beam B with respect to one or more of frequency and pulse frequency. Control of the wavelength can also be controlled by the modulation unit 38a, but is not itself capable of changing the wavelength of light. To change the wavelength, filters may be used and switched out of a broadband light source or a tunable laser set-up with narrowband light (e.g. using Littman configuration). The modulation unit 38a may also use feedback from the photosensor 30 (received through connection 40) to control light source 26 operation and modulate the light beam B to a selected wavelength and/or frequency.

In one example, the modulation unit 38a includes an FPGA or microprocessor that is capable of producing a TTL signal. This TTL signal is used to drive a switch which pulses the light source 26 at the resonant frequency (at a given duty cycle, e.g. 50%) of the tuning forks 28a, 28b and/or resonator 33. Additionally, there may be one or more laser driver chips that are used to power the light source 26 and the TTL signal can likewise be sent to the laser driver chip(s) to pulse the light source 26.

The controller 38 causes the light source 26 to emit the light beam B with a frequency in the absorption band of a target species, such as but not limited to, carbonyls, silanes, cyanates, carbon monoxide, hydrocarbons, and sulfides (e.g., $H_2S$), which may be present in toxic gases, aerosols, particulates, or mixtures of these. The light beam B is also pulsed at a pulse frequency that corresponds to the resonant frequency of the piezoelectric tuning forks 28. For instance, if the first and second tuning forks 28a, 28b have equivalent resonant frequencies of 19 kHz, the light beam B can be pulsed at a pulse frequency of 19 kHz.

If the analyte contains the target species, the target species will absorb a portion of the light beam B and emit an acoustic response, which causes the tuning forks 28a, 28b to resonate and thus results in a change in the first sensor signals above a baseline or background signal.

The controller 38 includes an analysis unit 38b, which is communicatively connected at 44 with the modulation unit 38a and with the photosensor 30 via communicative connection 40. As an example, the analysis unit 38b may include one or more algorithms for processing the first sensor signals and making the presence determination. For instance, if the first sensor signals exceed a threshold above the background signal, the analysis unit 38b makes a positive presence determination that the target species is present.

The photosensor 30 provides a mechanism for independently identifying a false positive from the tuning forks 28a, 28b of whether the target species is present in the analyte. As an example, the target species scatters a portion of the light beam B, reducing the intensity of the light received into the photosensor 30 in comparison to a baseline or background signal. The analysis unit 38b identifies a reduction in intensity below a predetermined threshold to make a positive presence determination. Intensity below the threshold is indicative of a positive presence determination. If the second sensor signals indicate a positive presence determination, this positive presence determination is compared to the presence determination made from the first signals of the piezoelectric tuning forks 28a, 28b to identify whether there is a fault. If there is a negative presence determination from the piezoelectric tuning forks 28a, 28b but a positive presence determination from the photosensor 30, the controller 38 triggers a fault. If there is a positive presence determination from the piezoelectric tuning forks 28a, 28b but a negative presence determination from the photosensor 30, the controller 38 triggers a fault, and generates a notification signal.

The analysis unit 38b can also be configured with one or more algorithms to determine a concentration of a detected target species. For example, the magnitude of the acoustic response of the target species is proportional to the concentration of the target species in the analyte. Therefore, the analysis unit 38b can use the magnitude of the first sensor signals to determine concentration by comparison of the first sensor signals to a lookup table (or other stored data format) in the controller 38 memory, for example. The lookup table may have predetermined correlation information that maps the level of the first sensor signals to a concentration level.

In this example, the controller 38 includes a differential amplifier 38c that is communicatively connected at 34 and 36 to the respective first and second piezoelectric tuning forks 28a, 28b to receive the first sensor signals of each of the first and second piezoelectric tuning forks 28a, 28b. The differential amplifier 38c is also communicatively connected at 46 to the analysis unit 38b. The differential amplifier 38c subtracts the first sensor signals of the second piezoelectric tuning fork 28b from the first sensor signals of the first piezoelectric tuning fork 28a. The first sensor signals of the second piezoelectric tuning fork 28b are out of phase with the first sensor signals of the first piezoelectric tuning fork 28a. The differential amplifier produces differentiated sensor signals, which the analysis unit 38b of the controller 38 may use to determine whether the target species is present in the analyte. That is, both tuning forks 28a, 28b are used to sense the analyte (rather than one being in a reference environment), thereby increasing sensitivity, while subtracting out the background. In a further example, the sensor signals are amplified and then sent to a differential amplifier, allowing monitoring of each signal and checking for a contaminated/faulty tuning fork. To identify a contaminated or faulty tuning fork, the signals may be monitored over time and periodically checked against a baseline signal level. Deviation from the baseline signal level may trigger a fault.

Figure 3:
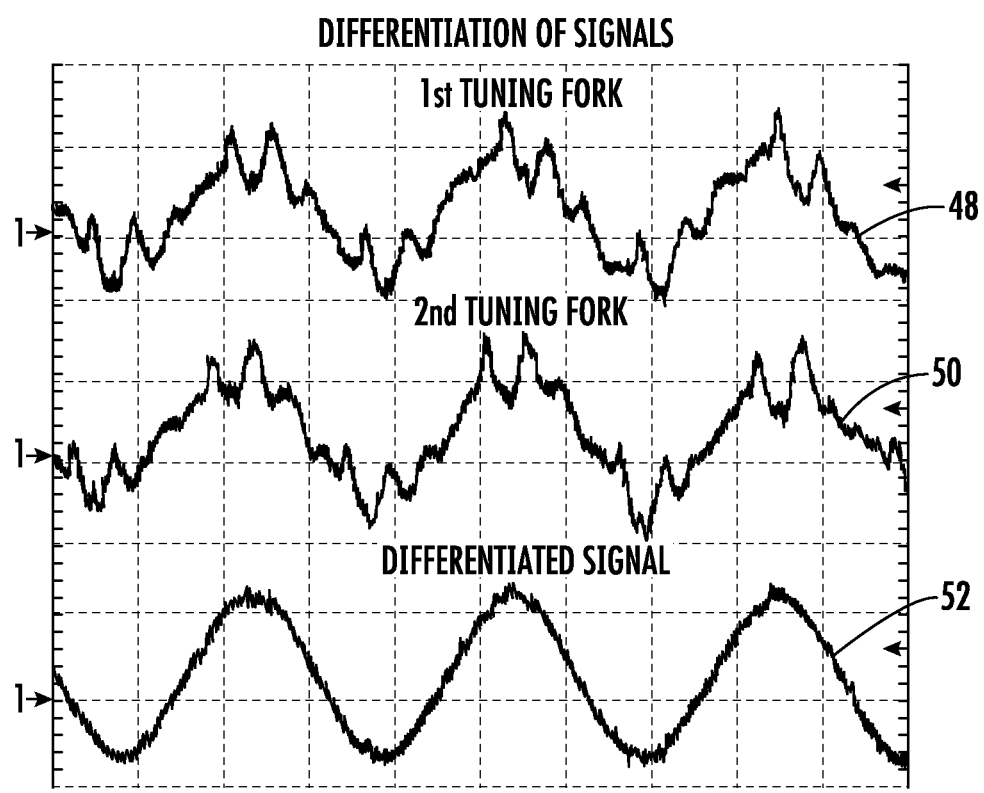
FIG. 3 illustrates a graph of a differential between sensor signals of two tuning forks.

An example of the differential signal is depicted in a graph in FIG. 3. The line 48 represents the first sensor signals of the first piezoelectric tuning fork 28a. The line 50 represents the first sensor signals of the second piezoelectric tuning fork 28b, and the line 52 represents the differentiated sensor signals. The differentiation removes the background portion of the signals, resulting in an enhanced signal to noise ratio, which in turn enables better sensitivity for detection of the target species. As an example, target species such as hydrogen sulfide may be detected to levels of 1 ppm.

Figure 4:
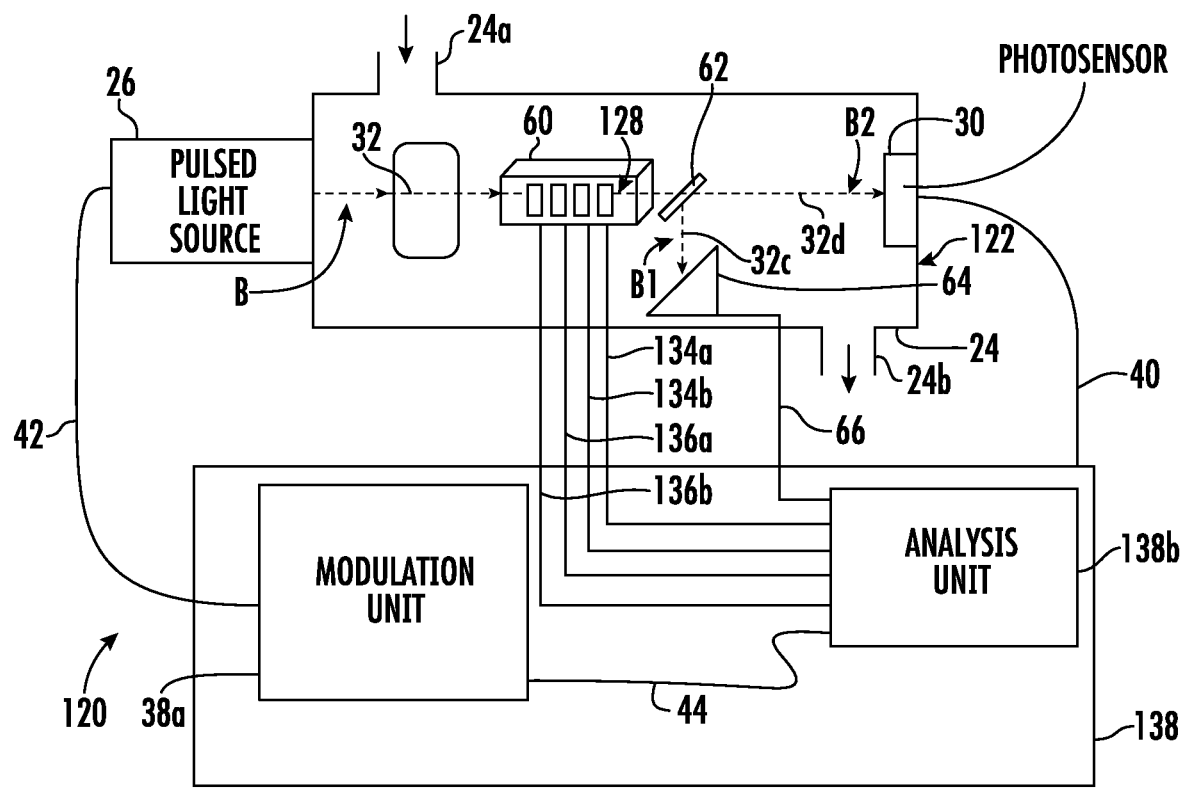
FIG. 4 illustrates another example photoacoustic detection system.

FIG. 4 illustrates another example photoacoustic detection system 120. In this disclosure, like reference numerals designate like elements where appropriate and reference numerals with the addition of one-hundred or multiples thereof designate modified elements that are understood to incorporate the same features and benefits of the corresponding elements. In this example, the detector 122 of the system 120 has an acoustic sensor 60 that includes a plurality of piezoelectric tuning forks 128. The piezoelectric tuning forks 128 are connected at 134a, 134b, 136a, and 136b to the analysis unit 138b of the controller 138. Although four piezoelectric tuning forks 128 are shown, there may alternatively be fewer or additional piezoelectric tuning forks 128.

The system 120 further includes a beam splitter 62 in the path 32. The beam splitter 62 is operable, when the light beam B is emitted, to divide the light beam B into first and second secondary light beams B1, B2 along respective first and second branch paths 32c, 32d. A sensor based on surface plasmon resonances 64 is arranged along the first branch path 32c, and the photosensor 30 is arranged along the second branch passage 32d. The surface plasmon resonance sensor 64 is communicatively connected at 66 to the analysis unit 138b of the controller 138 and is operable to emit third sensor signals. The surface plasmon resonance sensor 64 provides an additional (to the photosensor 30) mechanism for making an independent determination of whether the target species is present in the analyte.

Figure 5:
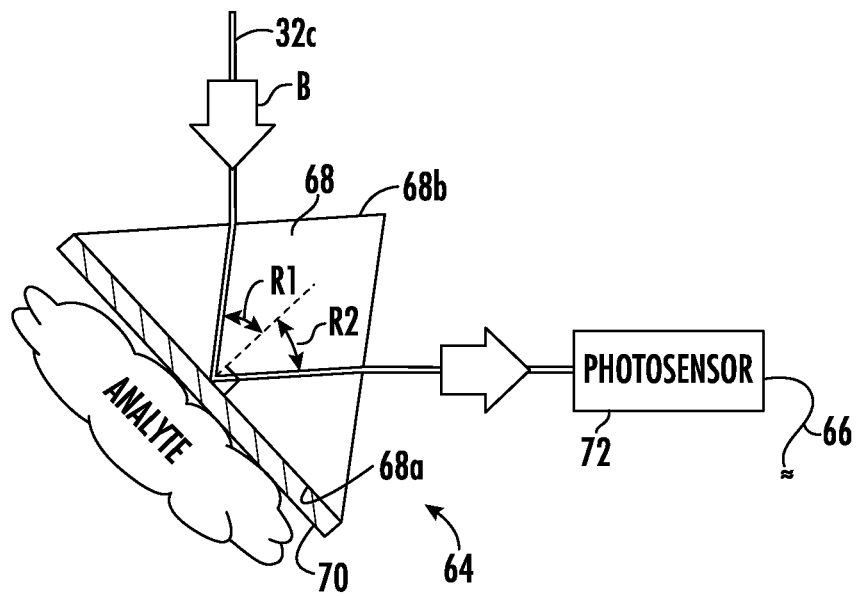
FIG. 5 illustrates a surface plasmon sensor of the system of FIG. 4.

FIG. 5 illustrates an example of the surface plasmon resonance sensor 64. The surface plasmon resonance sensor 64 includes a prism 68 that is coated on a first face 68a with a thin metal film 70, such as a gold coating. The prism 68 is situated to reflect the light beam B to a photosensor 72.

The metal film is exposed to the analyte in the chamber 24. The light beam B enters the prism 68 through a second face 68b and propagates at an angle of incidence R1 toward the interface of the prism 68 with the metal film 70. The light beam B excites surface plasmon polaritons in the metal film and reflects off of the interface at a resonance angle R2. If the analyte contains the target species, the binding of the target species with the metal film causes a change in the resonance angle R2, due to a change in the electrical permittivity, thereby reducing the light beam B intensity. The photosensor 72 is used to monitor the light beam B intensity and emit the third sensor signals to the controller 138 for analysis. As will be appreciated, surface plasmon resonance sensors and devices are known and other types of surface plasmon sensors and techniques may be used.

The analysis unit 138b of the controller 138 processes the third sensor signals to independently identify false positive determinations made by the piezoelectric tuning forks 128. As an example, if the third sensor signals exceed a threshold above a background signal, the analysis unit 138b makes a positive presence determination that the target species is present. This positive presence determination can then be compared to the presence determination made from the first signals of the piezoelectric tuning forks 128 to identify whether there is a fault. If there is a negative presence determination from the piezoelectric tuning forks 128 but a positive presence determination from the surface plasmon resonance sensor 64, the controller 138 triggers a fault. If there is a positive presence determination from the piezoelectric tuning forks 128 but a negative presence determination from the surface plasmon resonance sensor 64, the controller 138 triggers a fault, and generates a notification signal. The surface plasmon resonance sensor 64 thus provides another level of redundancy to the photosensor 30.

In a further example, the controller 138 is also configured to distinguish a chemical identity of the target species based on a distinct signature across the first, second, and third sensor signals. For instance, target species, such as but not limited to, hydrogen sulfide ($H_2S$) may have close chemical analogs that produce similar but not identical responses in the piezoelectric tuning forks 128 (or 28a, 28b in FIG. 1). Likewise, the analogs may produce similar but not identical responses in the surface plasmon resonance sensor 64 and the photosensor 30. To distinguish the analogs, the controller 138 compiles the responses across the piezoelectric tuning forks 128, the surface plasmon resonance sensor 64, and the photosensor 30 to produce a signature thumbprint for each analog. The signatures of the analogs can then be compared to a library of signatures to identify which analog the target species is. Additionally or alternatively, the responses across the piezoelectric tuning forks 128, the surface plasmon resonance sensor 64, and the photosensor 30 can be input into a neural network to build a foundation for identifying and distinguishing analogs.

In a further example, the system 120 is also configured for tunable diode laser absorption spectroscopy (TDLAS). TDLAS involves absorption at a single frequency or wavenumber in the absorption spectrum of the target species. The controller 138 tunes the light source 26 to emit the light beam B with a wavelength at a particular frequency or wavenumber. The portion of the light beam B that is not absorbed (i.e. the portion that is transmitted) is received at the photosensor 30 and can be compared versus a baseline or background to determine intensity. The intensity is related to concentration by the Beer-Lambert law. The controller 138 can thus use a lookup table (or other stored data format) stored in memory to determine the concentration for a given intensity. As examples, the concentration can be used for early warning, for verification of concentration determined from the acoustic sensor 60, or both.

Figure 6:
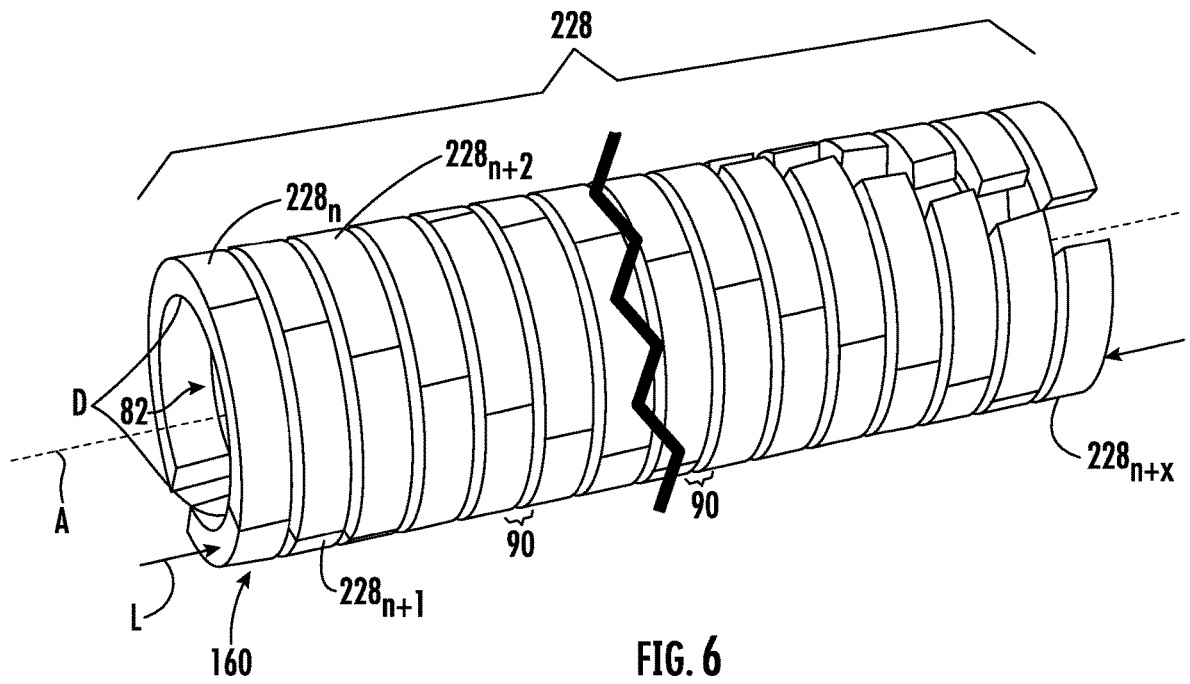
FIG. 6 illustrates an example piezoelectric acoustic sensor.

FIG. 6 illustrates another example of an acoustic sensor 160 that can be used in the system 20 or 120 in place of tuning forks 28, and acoustic sensor 60, respectively. In this example, the acoustic sensor 160 includes a series of piezoelectric tuning forks 228, including piezoelectric tuning forks $228_n$ through $228_{n+x}$, wherein n=1 and x is at least 2, at least 5, at least 10, or at least 14. The piezoelectric tuning forks 228 are arranged side-by-side along an axis A, which in the system 120 is coaxial with the path 32.

Figure 7:
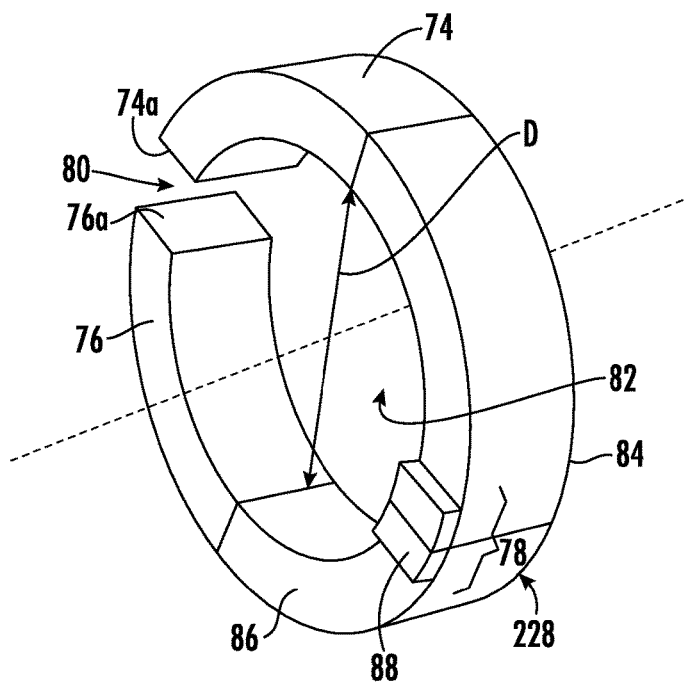
FIG. 7 illustrates a piezoelectric tuning fork of the sensor of FIG. 5.

FIG. 7 illustrates a representative example of one of the piezoelectric tuning forks 228. Each piezoelectric tuning fork 228 has first and second tines 74, 76 that extend from a base section 78 to respective tips 74a, 76a of the tines 74, 76. The tines 74, 76 are semi-circular in this example. Alternatively, the tines 74, 76 could be square, rectangular, or other geometry as long as they together form a resonator chamber with a resonant frequency tuned to that of the tines (or the resonant frequency of the tines tuned to the resonator chamber).

There is an opening 80 between the tips 74a, 76b. The tines 74, 76 straddle the axis A so as to form a portion of a resonance cavity 82 (see also FIG. 6). The openings 80 are oriented at clocked positions about the axis A so as to maintain the resonance cavity 82. A clocked position is the orientation of the opening 80 with respect to an adjacent opening 80. The clocked position can be described by an angle of rotation between two openings 80 with respect to a reference orientation. If the openings 80 were not clocked, the resonance cavity 82 would be less responsive as the continuous cylindrical geometry would be compromised with the one large continuous gap. As an additional measure to preserve the continuous cylindrical geometry, the openings 80 should be as small as possible and isolated.

Tuning of the tines 74, 76 can be accomplished by changing the length of the respective portions of the legs composed of two different materials, a conductor and a piezoelectric, e.g. gold and quartz. The resonance cavity 82 has a length L and an internal diameter D (FIG. 6). The length L is equal to the sum of the tine widths of the piezoelectric tuning forks 228 and the sum of gaps 90 in the axial direction along axis A. Each of the piezoelectric tuning forks 228 has a unique resonant frequency. In this regard, each piezoelectric tuning fork 228 has a tine length that the tines 74, 76 extend from the base section 78, a tine width between lateral sides 84, 86 of the piezoelectric tuning fork 228, and a tip gap size of the opening 80. The tine length, tine width, and tip gap size may differ among the piezoelectric tuning forks 228 to provide the unique resonant frequencies. The resonant frequencies can be first order frequencies, but the piezoelectric tuning forks 228 may also have other unique resonant frequency modes that could be used in addition to or instead of the first order resonant frequency (i.e., the first order resonant frequency is part of a unique set of resonant frequencies for each piezoelectric tuning fork 228). As depicted in FIG. 6, the piezoelectric tuning forks 228 may be mechanically interconnected via attachment sections 88 on the base section 78, but the tines 74, 76 of neighboring piezoelectric tuning forks 228 are spaced apart by gaps 90. As an example, the size of the gaps 90 are equal in the direction of the axis A.

Although unique, the resonant frequencies of the piezoelectric tuning forks 228 are relatively close. As an example, the unique resonant frequencies fall within a range of 4 kHz (between the largest resonant frequency and the smallest resonant frequency). In additional examples, the range is tighter, within a range of 1 kHz or within a range of 0.5 kHz. In one further example, the unique resonant frequencies are also greater than at least 18 kHz. For instance, if the resonant frequencies were 18.0 kHz, 18.4 kHz, 18.8 kHz, 19.2 kHz, and 19.6 kHz, the range would be 1.6 kHz (the difference between the largest value 19.6 kHz and the smallest value of 18.0 kHz), and each of the resonant frequencies would be equal to or greater than 18.0 kHz.

The unique resonant frequencies of the piezoelectric tuning forks 228 provide the ability to capture and analyze a frequency band of photoacoustic responses of a target species rather than the response at only a single frequency point. As described above, if the analyte contains the target species, the target species will absorb a portion of the light beam B and emit an acoustic response. The acoustic response may be strongest at one discrete target frequency, but there may also be secondary acoustic responses at off-target frequencies close to the target frequency. The secondary acoustic responses at the off-target frequencies can be used to further characterize and identify the target species or to distinguish analogs. For instance, two analogs may have similar responses at the target frequency that is difficult to discern. However, the secondary responses at the off-target frequencies may differ and enable a direct distinction or distinction in combination with the signatures across the surface plasmon sensor 64 and photosensor 30. The piezoelectric tuning forks 228 can also be arranged as pairs, similar to tuning forks 28a, 28b, and used with the differential amplifier 38c to produce differentiated sensor signals as described above.

In one further example, the range of unique resonant frequencies of the piezoelectric tuning forks 228 enables the controller 138 to compile a response spectrum of signal intensity versus resonant frequency. The response spectrum can then be compared to library spectra, a prior collected response spectrum, or a response spectrum that is later collected in order to aid a presence determination or chemically identify a target species.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A photoacoustic detection system comprising:
a detector including,
a pulsed light source operable to emit a light beam along a path, a plurality of piezoelectric tuning forks arranged side-by-side so as to form a resonance cavity along the path, each of the piezoelectric tuning forks having a respective unique resonant frequency, and each of the piezoelectric tuning forks operable to emit sensor signals indicative of a photoacoustic response of an analyte to interaction of the analyte with the light beam; and a controller connected to receive the sensor signals, wherein the path defines a central axis and each of the piezoelectric tuning forks having first and second tines that straddle the central axis, and wherein each of the piezoelectric tuning forks has an opening defined between tips of the first and second tines, and each opening is oriented at a different clocked position about the central axis without a continuous gap between the openings.

2. The system as recited in claim 1, wherein the first and second tines include gold and quartz.

3. The system as recited in claim 1, wherein the controller is configured to determine whether a target species is present in the analyte based on an intensity of the photoacoustic response.

4. The system as recited in claim 1, wherein the controller is configured to determine an identity of a target species that is present in the analyte based on a spectrum of the photoacoustic response across the piezoelectric tuning forks.

5. The system as recited in claim 1, wherein the unique resonant frequencies fall within a range of 4 kHz between a largest one of the unique resonant frequencies frequency and a smallest one of the unique resonant frequencies.

6. A photoacoustic detection system comprising:

a series of piezoelectric tuning forks arranged side-by-side along an axis, each of the piezoelectric tuning forks having a unique resonant frequency and each of the piezoelectric tuning forks having first and second tines that straddle the axis so as to form a resonance cavity, wherein each of the piezoelectric tuning forks has an opening defined between tips of the first and second tines, and each opening is oriented at a different clocked position about the central axis without a continuous gap between the openings.

7. The system as recited in claim 6, wherein the unique resonant frequencies fall within a range of 4 kHz between a largest one of the unique resonant frequencies frequency and a smallest one of the unique resonant frequencies.

* * * * *